June 23, 1925.

F. T. CRICHTON

STEERING WHEEL

Filed June 25, 1924

1,543,101

Inventor:
Fred T. Crichton
by Albert Scheible
Attorney

Patented June 23, 1925.

1,543,101

UNITED STATES PATENT OFFICE.

FRED T. CRICHTON, OF CHICAGO, ILLINOIS, ASSIGNOR OF FORTY-NINE ONE-HUNDREDTHS TO GRACE T. CRICHTON.

STEERING WHEEL.

Application filed June 25, 1924. Serial No. 722,254.

*To all whom it may concern:*

Be it known that I, FRED T. CRICHTON, citizen of the United States, residing at Chicago, in the county of Cook and State of Illinois, have invented certain new and useful Improvements in a Steering Wheel; and I do hereby declare the following to be a full, clear, and exact description of the invention, such as will enable others skilled in the art to which it appertains to make and use the same.

My invention relates to steering wheels for automobiles and the like and has for its general objects the providing of a steering wheel which will make it easier for the driver of the vehicle to get into and out of his seat, which will enable the user to employ a more normal and less fatiguing position of his arms and hands while driving, which will afford wrist supports permitting the user to rest his hands, which will normally provide added space behind the steering wheel so as to prevent injury to the driver when the vehicle is suddenly halted, and which will permit the driver to resist a forward movement of his body by merely pushing against the steering wheel.

In automobile practice, it has long been customary to employ a rearwardly inclined steering post carrying a steering wheel which has an annular rim overhanging the seat of the driver. In practice, the rear portion of this steering wheel comes so close to the seat of the driver as to make it difficult for the driver to enter or leave his seat except by a sliding motion during which his clothes tend to wipe up any dust that has accumulated on the seat. The overhanging of the seat by the rear portion of the driving wheel also brings the rear portion of the wheel rather close to the body of the driver, so that during a sudden halting of the vehicle the acquired momentum may throw him forward into violent engagement with the driving wheel, numerous and serious accidents having been due to this cause.

A further objection to the steering wheel as commonly employed lies in the fact that the driver must twist his wrists and hold his hands in unusual and rather strained positions, and that his arms have no support back of his grasp on the steering wheel, thereby causing a ready fatiguing of his hands and arms. So also, since the rim of the steering wheel is normally grasped at diametrically opposed portions which are disposed longitudinally of the wheel, a relatively tight gripping of the hands is required to retain the control on the wheel, thereby adding to the fatigue. A still further objection, particularly in the case of persons of relatively small height, lies in the partial obstruction of the driver's view by the forward portion of the ordinary steering wheel.

My present invention aims to provide a steering wheel which will simultaneously overcome all of the above named objections and which also will avoid the serious objections encountered with steering wheels constructed so that they can be tilted substantially about their hubs to afford an added entering space adjacent to the seat of the driver. Any arrangement of the last named type is objectionable because of the complications involved in their construction, and even more so because a sudden jar to the vehicle is apt to unsnap the latch which holds the wheel in its normal position, thereby leaving the wheel free to move about it pivotal mounting and depriving the driver of a positive control of the steering wheel at the very time when he may need this most.

Still further and also more detailed objects of my invention will appear from the following specification and from the accompanying drawings in which—

Figure 1:
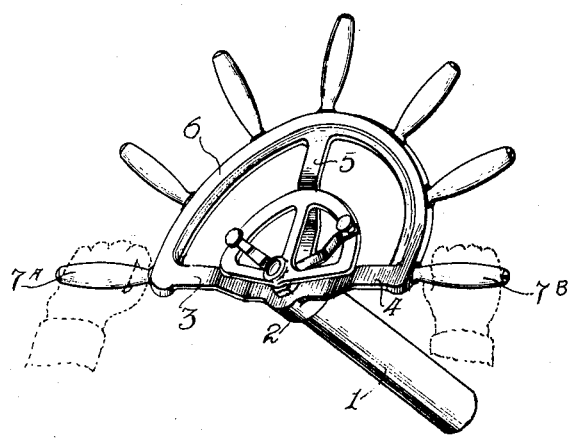
Fig. 1 is a perspective view of a steering wheel embodying my invention, showing this as it appears upon the upper end of the usual steering post.

In accomplishing the purposes of my invention after the manner of the accompanying drawings, I provide a steering wheel having a rim rigidly supported by a hub and desirably integral with the latter. Thus, Fig. 1 shows a steering post 1 as supporting a hub 2 which is secured to the post in any customary manner. The hub 2 has integral with it arms 3, 4 and 5 which extend radially of the hub and which support an integral and substantially semi-circular rim portion 6. This rim portion 6 spans the free ends of the arms 3 and 4, the latter being disposed in extension of each other substantially diametrically of the hub so as to combine in forming a cross-bar which is at the rear of the wheel when the vehicle is being driven straight ahead.

Figure 3:
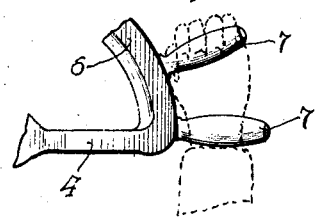
Fig. 3 is a fragmentary plan view showing how one of the handles of my steering wheel affords an auxiliary support or rest for a hand grasping the next handle.

Projecting outwardly from the semi-circular rim portion 6 are a plurality of handles 7 which desirably extend radially of the wheel. Two of these handles preferably are disposed substantially in extension of the arms 3 and 4 which afford the rear cross-bar portion of the wheel rim, and the handles desirably are consecutively spaced from each other so that each handle can afford to rest for the hand grasping the next handle forward thereof, after the manner shown in Fig. 3. To provide the required strength and rigidity for the handles, I desirably provide each handle with a longitudinal bore of a size adapted to slip over a radially projecting stem 8 on the wheel rim portion 6. Each such handle may be made of wood, bakelite, or other suitable material and may be detachably fastened to the supporting stem 8 by any suitable means such as the end screw 9 of Fig. 4.

With the steering wheel thus arranged, it will be obvious from Fig. 1 that the driver can readily grasp a pair of the handles on the wheel without turning his wrist or otherwise bringing his hands or arms into a strained position. In doing so, he can effect the steering either by a pulling action or by a pushing action and hence can readily retain the positive control of the wheel without employing the tight grip which is required with the ordinary type of steering wheel owing to the fact that the grip portions of the wheel extend longitudinally of the vehicle and hence would tend to slide through his hands unless tightly gripped. Owing to this less strained position of his hands and to the avoiding of any tight gripping under ordinary driving conditions, the fatigue encountered even on long drives is greatly reduced. So also, the radial handles afford a non-slipping control of the wheel even when the driver's hands are incased in mitts, avoiding the difficulties encountered by the slipping of the hands within the mitts when handling steering wheels of the types heretofore in common use.

By providing a considerable number of handles arranged as above described, I also enable the user to exert a more effective leverage, particularly since he can readily employ both a pulling action with one hand and a pushing thrust with the other hand. In making any considerable turn of the wheel, one hand can easily keep a firm grip on the corresponding handle while the other hand is shifted in position to some other than the one previously grasped by it. Furthermore, the user of my steering wheel can at any time rest either hand by allowing it to be partly supported by a more rearward handle after the manner of Fig. 3, thus securing the added advantage of resting his hands and arms without waiving a positive control of the steering wheel while so doing.

Figure 2:
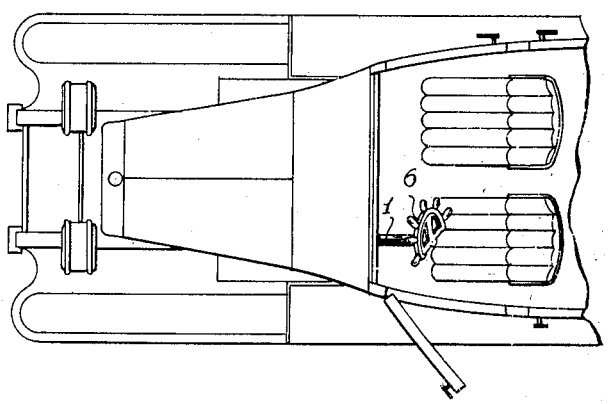
Fig. 2 is a plan view of the forward portion of an automobile, showing the same steering wheel as it appears when in position for facilitating the entry of the vehicle by the driver.

While my steering wheel may readily be built in a variety of diameters, the rim portion 6 is preferably of a diameter considerably smaller than that of the customary steering wheels, so that the radial distance from the axis of the hub to the tip of any one of the handles can be about the same as the radius of the customary steering wheel. Such a general dimension brings the diametrically disposed and most commonly grasped handles 7$^A$ and 7$^B$ in a position corresponding substantially to the spread of the arms of the average driver. At the same time, it increases the normal distance between his body and the steering wheel by nearly half of the usual diameter of such a wheel, and this decided increase in space makes it easy for the user to get into and out of his machine without an awkward sliding along the seat in a cramped position. So also, by slightly turning the wheel after the manner of Fig. 2, he can augment even this increased space so as to have an almost unrestricted passage to and from the adjacent door of the car.

In case the user is obliged to halt his vehicle suddenly when he has been traveling at a considerable speed, my steering wheel also affords two decided advantages which will avoid such accidents as those heretofore referred to. In such a case, his body could only contact with the rear of the wheel after it has moved considerably further than the distance which would effect engagement with an ordinary driving wheel under the same circumstances. At the same time, the normal grasping of the handles after the manner of Fig. 1 enables the driver to exert a pushing thrust on the handles instantly, even if he has not been tightly gripping these handles. Hence he can readily push against the handles to resist any forward movement of his body when making a sudden stop, thereby positively preventing him from being slammed against the steering wheel even though he may be quite corpulent. The open spaces between the forwardly disposed handles also increased the readiness with which the driver, particularly if he or she is small in height, can see beyond the wheel, thereby affording a further important advantage over the old types of steering wheels.

Figure 5:
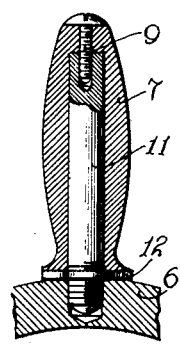
Fig. 5 is a similar section showing another construction, namely one in which each handle support is formed by a separate stem threaded into the rim of the wheel.
Figure 4:
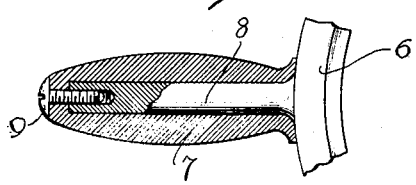
Fig. 4 is a section taken through one of the handles of a steering wheel embodying my invention, showing a construction in which the supporting stems for the handles are integral with the rim of the wheel.

It will be obvious from the above that all of these decidedly advantageous objects can readily be accomplished in a quite simple and easily manufactured construction and that a mounting of the handles such as those shown in Fig. 4 will readily insure the desired leverage and strength. However, I do not wish to be limited to this particular handle mounting or to other details of the arrangement here shown and described, since many changes might obviously be made without departing either from the spirit of my invention or from the appended claims. For example, Fig. 5 shows a handle mounting in which the rim portion 6 is not provided with integral projecting handle stems, but has outwardly open and radially disposed threaded bores 10 adapted to receive separate threaded studs 11 carrying the handles, each such stud being desirably locked against unscrewing by a lock-nut 12 interposed between the adjacent handle 7 and the rim portion 6.

I claim as my invention:—

1. The combination with the steering post of a self-propelling vehicle, of a steering wheel fast upon the post; the said wheel comprising a substantially semi-circular rim having its diametric side parallel to the driver's seat, and its arcuate portion forwardly directed when the steering post is disposed for directing the vehicle straight ahead, and a plurality of uniformly spaced handles projecting radially outward from the said arcuate rim portion in a plane transverse of the axis of the steering post, the diametric side of the rim being formed by two spokes of the wheel.

2. A vehicle steering wheel comprising a hub, a plurality of handles extending radially of the hub in a common plane transverse of the hub, the handles being of uniform size and all equally distant from the hub, and supporting means connecting the hub with the handles; the handles all being within a semicircle which is coaxial with the hub and which has its arcuate side forward of the hub and its diametric side parallel to the seat of the driver when the wheel is positioned for steering the vehicle straight ahead; the two rearmost handles being in alinement with each other and with the axis of the hub and being disposed parallel to the driver's seat when the wheel is in its said straight ahead driving position so as to leave an entirely free space back of these handles and of the hub and so as to dispose these two handles for receiving a pushing thrust from the driver's hands to prevent the driver from being moved forwardly in case of sudden halting of the vehicle.

3. A steering device for automobiles including a substantially straight primary steering member having an outwardly extending handle on each end thereof, a substantially semi-circular secondary steering member having a series of spaced radial handles thereon, said secondary member being connected at its ends to the end portions of the primary member, and means to connect the primary member to the steering post of an automobile and in approximate register therewith whereby during straight travel of the automobile substantially the entire device is disposed in front of the steering post.

4. A steering device for automobiles including a substantially straight primary steering member having an outwardly extending handle on each end thereof, a substantially semi-circular secondary steering member having a series of spaced radial handles thereon, said secondary member being connected at its ends to the end portions of the primary member, and means to connect the primary member to the steering post of an automobile and in approximate register therewith whereby during straight travel of the automobile, substantially the entire device is disposed in front of the steering post, the handles of the secondary member being disposed in such relation to the handles of the primary member so as to enable the driver to rest his hands on the handles of the primary member while gripping the said adjacent handles of the secondary member.

5. A vehicle steering wheel comprising a hub, an arcuate rim curving forwardly of the hub and terminating at its rear ends substantially in line with the hub, handles supporting the rim from the hub, and spaced arms carried by the rim and projecting outwardly therefrom substantially radially of the hub, the consecutive handles being spaced so that each thereof affords a rest for a hand grasping the handle forward thereof.

Signed at Chicago, Illinois, June 23, 1924.

FRED T. CRICHTON.